United States Patent
Haller et al.

(10) Patent No.: US 8,684,461 B2
(45) Date of Patent: Apr. 1, 2014

(54) HORIZONTAL SEAT ADJUSTMENT MEANS

(75) Inventors: Erwin Haller, Birgland (DE); Jens Kolb, Koenigstein (DE)

(73) Assignee: Grammer AG, Amberg (DE)

( * ) Notice: Subject to any disclaimer, the term of this patent is extended or adjusted under 35 U.S.C. 154(b) by 128 days.

(21) Appl. No.: 13/328,599

(22) Filed: Dec. 16, 2011

(65) Prior Publication Data

US 2012/0153695 A1   Jun. 21, 2012

(30) Foreign Application Priority Data

Dec. 21, 2010  (DE) .......................... 10 2010 055 342

(51) Int. Cl.
*B60N 2/04*  (2006.01)

(52) U.S. Cl.
USPC ................. 297/303.2; 297/302.2; 297/344.11

(58) Field of Classification Search
USPC ........ 297/303.2, 302.2, 344.11, 300.3, 301.2; 267/131, 133, 140.11, 140.5
See application file for complete search history.

(56) References Cited

U.S. PATENT DOCUMENTS

| | | |
|---|---|---|
| 2,118,456 A | 5/1938 | Whedon |
| 3,300,203 A | 1/1967 | Carter et al. |
| 3,752,432 A | 8/1973 | Lowe |
| 4,151,973 A | 5/1979 | Sedlock |
| 4,213,594 A | 7/1980 | Pietsch et al. |
| 4,286,765 A | 9/1981 | Delgleize et al. |
| 4,350,317 A | 9/1982 | Aondetto |
| 4,408,744 A | 10/1983 | Thompson |
| 4,451,079 A | 5/1984 | Takahashi |
| 4,477,050 A | 10/1984 | Thompson et al. |
| 4,573,657 A | 3/1986 | Sakamoto |
| 4,645,169 A | 2/1987 | Mischer |
| 4,679,760 A | 7/1987 | Dotzler et al. |
| 4,684,100 A | 8/1987 | Grassl |
| 4,729,539 A | 3/1988 | Nagata |
| 4,773,671 A | 9/1988 | Inagaki |
| 4,784,434 A | 11/1988 | Iwami |
| 4,856,763 A | 8/1989 | Brodersen et al. |
| 4,943,037 A | 7/1990 | Brodersen et al. |

(Continued)

FOREIGN PATENT DOCUMENTS

| | | |
|---|---|---|
| CN | 100493951 C | 6/2009 |
| DE | 1 898 307 U | 8/1964 |

(Continued)

OTHER PUBLICATIONS

Office Action for German Patent Application No. 10 2010 055 342.5, mailed Oct. 6, 2011.

(Continued)

*Primary Examiner* — Sarah B McPartlin
(74) *Attorney, Agent, or Firm* — Lathrop & Gage LLP

(57) ABSTRACT

The invention relates to a seat for a vehicle, in particular for all-terrain vehicles, with at least one seat area extending in the longitudinal direction (X) of the vehicle and in the width-wise direction (Y) of the vehicle for receiving a person, a backrest for supporting the back of the person and a holding device connected in the vertical direction (Z) under the seat area and to the latter for keeping the seat area at a distance from a coupling region for coupling the seat to the vehicle, wherein the holding device has at least one spring device for the movable arrangement at least for a time of at least the seat area with respect to the coupling region in the longitudinal direction (X) of the vehicle and/or in the width-wise direction (Y) of the vehicle.

15 Claims, 10 Drawing Sheets

(56) References Cited

U.S. PATENT DOCUMENTS

| | | |
|---|---|---|
| 4,993,778 A | 2/1991 | Colin et al. |
| 5,058,852 A | 10/1991 | Meier et al. |
| 5,125,631 A | 6/1992 | Brodersen et al. |
| 5,211,369 A | 5/1993 | Hoerner |
| 5,251,864 A | 10/1993 | Itou |
| 5,364,060 A | 11/1994 | Donovan et al. |
| 5,521,821 A | 5/1996 | Shimizu et al. |
| 5,533,703 A | 7/1996 | Grassl et al. |
| 5,553,911 A | 9/1996 | Bodin et al. |
| 5,582,385 A | 12/1996 | Boyle et al. |
| 5,735,509 A | 4/1998 | Gryp et al. |
| 5,765,802 A | 6/1998 | Bostrom et al. |
| 5,791,738 A | 8/1998 | Niezoldt |
| 5,794,911 A | 8/1998 | Hill |
| 5,871,198 A | 2/1999 | Bostrom et al. |
| 5,957,426 A | 9/1999 | Brodersen |
| 5,967,604 A | 10/1999 | Yoshida et al. |
| 5,971,116 A | 10/1999 | Franklin |
| 6,042,093 A | 3/2000 | Garelick |
| 6,340,201 B1 | 1/2002 | Higuchi |
| 6,478,102 B1 | 11/2002 | Puterbaugh et al. |
| 6,543,755 B2 | 4/2003 | Monson et al. |
| 6,616,116 B1 | 9/2003 | Rochau et al. |
| 6,637,735 B2 | 10/2003 | Monson et al. |
| 6,763,550 B2 | 7/2004 | Regnier |
| 6,802,408 B2 | 10/2004 | Krammer |
| 7,044,553 B2 | 5/2006 | Ropp |
| 7,152,839 B2 | 12/2006 | Mullinix et al. |
| 7,168,671 B2 | 1/2007 | Bostrom et al. |
| 7,185,867 B2 | 3/2007 | Hill et al. |
| 7,712,836 B2 | 5/2010 | Deml |
| 7,810,884 B2 | 10/2010 | Lorey et al. |
| 7,886,882 B2 | 2/2011 | Behmenburg et al. |
| 7,942,248 B2 | 5/2011 | St. Clair et al. |
| 8,118,287 B2 | 2/2012 | Schordine |
| 2001/0035600 A1 | 11/2001 | St. Clair |
| 2002/0011699 A1 | 1/2002 | St.Clair |
| 2006/0278805 A1 | 12/2006 | Haller |
| 2007/0278723 A1 | 12/2007 | Shoemaker et al. |
| 2008/0000738 A1 | 1/2008 | Zdeb |
| 2008/0000739 A1 | 1/2008 | Behmenburg et al. |
| 2008/0088165 A1 | 4/2008 | Deml |
| 2008/0156602 A1 | 7/2008 | Hiemenz et al. |
| 2008/0197684 A1 | 8/2008 | Ott et al. |
| 2009/0134595 A1 | 5/2009 | Haller et al. |
| 2009/0179390 A1 | 7/2009 | Wurmthaler et al. |
| 2009/0184448 A1 | 7/2009 | Hiser |
| 2009/0256293 A1 | 10/2009 | Ward |
| 2009/0283944 A1 | 11/2009 | Schordine |
| 2010/0052356 A1 | 3/2010 | Lewis, II |
| 2010/0072800 A1 | 3/2010 | Weber et al. |
| 2010/0102493 A1 | 4/2010 | Deml et al. |
| 2010/0117428 A1 | 5/2010 | Deml et al. |
| 2011/0001033 A1 | 1/2011 | Kohl et al. |
| 2011/0001342 A1 | 1/2011 | Deml et al. |
| 2011/0022265 A1 | 1/2011 | Sekiya |
| 2011/0226930 A1 | 9/2011 | Enns et al. |
| 2011/0278894 A1 | 11/2011 | Lorey |
| 2012/0025577 A1 | 2/2012 | Kolb |
| 2012/0043798 A1 | 2/2012 | Haller et al. |
| 2012/0049421 A1 | 3/2012 | Haller et al. |
| 2012/0086159 A1 | 4/2012 | Kolb |
| 2012/0090930 A1 | 4/2012 | Haller |
| 2012/0091773 A1 | 4/2012 | Lorey |
| 2012/0126592 A1 | 5/2012 | Kaessner et al. |
| 2012/0153689 A1 | 6/2012 | Haller et al. |
| 2012/0153695 A1 | 6/2012 | Haller et al. |
| 2012/0187615 A1 | 7/2012 | Haller et al. |

FOREIGN PATENT DOCUMENTS

| | | |
|---|---|---|
| DE | 15 55 056 | 3/1970 |
| DE | 19 16 403 A1 | 10/1970 |
| DE | 21 13 579 | 10/1972 |
| DE | 28 06 247 C2 | 8/1979 |
| DE | 28 11 034 A1 | 9/1979 |
| DE | 28 51 129 A1 | 6/1980 |
| DE | 32 42 287 A1 | 5/1984 |
| DE | 3517345 A1 | 11/1986 |
| DE | 38 24 272 A1 | 3/1990 |
| DE | 41 01 221 A1 | 7/1992 |
| DE | 696 06 732 T2 | 4/1995 |
| DE | 197 56 252 A1 | 7/1998 |
| DE | 197 41 602 A1 | 3/1999 |
| DE | 603 20 456 T2 | 12/2002 |
| DE | 699 08 290 | 5/2004 |
| DE | 10 2005 028 725 A1 | 1/2006 |
| DE | 10 2006 016 047 B3 | 4/2006 |
| DE | 10 2005 003 833 | 6/2006 |
| DE | 10 2005 011 856 B3 | 8/2006 |
| DE | 10 2007 030 467 A1 | 1/2009 |
| DE | 10 2008 016 685 B3 | 6/2009 |
| DE | 10 2008 010 719 A1 | 8/2009 |
| DE | 10 2008 045 492 A1 | 3/2010 |
| DE | 10 2008 052 960 | 4/2010 |
| DE | 10 2008 056 200 A1 | 5/2010 |
| DE | 10 2009 020 034 A1 | 11/2010 |
| DE | 10 2009 040 010 A1 | 1/2011 |
| EP | 0 054 880 A1 | 12/1981 |
| EP | 0 054 947 A1 | 12/1981 |
| EP | 0 089 794 | 9/1983 |
| EP | 0 448 340 A2 | 9/1991 |
| EP | 0 739 766 | 10/1996 |
| EP | 1 035 258 A1 | 6/1999 |
| EP | 2 420 404 | 2/2012 |
| GB | 1 166 258 | 10/1969 |
| GB | 1199577 | 7/1970 |
| GB | 1 383 922 | 2/1974 |
| GB | 2 014 522 | 8/1979 |
| JP | 63220026 A | 9/1988 |
| JP | 1237471 A | 9/1989 |
| JP | 09136611 | 5/1997 |
| JP | 2007 062 539 A | 3/2007 |
| WO | WO 2004/110808 | 12/2004 |

OTHER PUBLICATIONS

Extended European Search Report for parallel European Patent Application No. 11 19 5031, mailed Apr. 5, 2012.
Office Action for German patent application No. 10 2010 048 210.2, mailed Jul. 7, 2011.
Office Action for German patent application No. 10 2010 051 325.3, mailed Oct. 10, 2011.
Office Action for German Patent Application No. 10 2010 055 344.1, mailed Oct. 5, 2011.
Examination Report dated Aug. 24, 2012, from the German Patent Office for German Patent Application No. 10 2010 026 569.1.
First Office Action dated Mar. 29, 2012 for Chinese Patent Application No. 201010244916.3.
First Office Action dated Mar. 29, 2012 for Chinese Patent Application No. 201010244916.3, English translation.
Office Action, Chinese Patent Application No. 201110052443.1, dated Dec. 30, 2012.
Office Action, Chinese Patent Application No. 201110052443.1, dated Dec. 30, 2012, English Translation.
Examination Report for German Patent Application No. 10 2011 009 530.6 dated May 4, 2012.
Extended European Search Report for European Patent Application No. 12 15 9863, dated Jul. 4, 2012.
Office Action for German Patent Application No. 10 2011 015 364.0, mailed Feb. 6, 2012.
Extended European Search Report for parallel European Patent Application No. 11 19 5039, mailed Apr. 5, 2012.
Search Report for European Patent Application No. 11177689.4, mailed Dec. 14, 2011.
Office Action for German Patent Application No. 10 2010 035 888.6 mailed Jun. 9, 2011.
European Search Report for European Patent Application No. 12 159 863.5, mailed Jul. 10, 2013.

HORIZONTAL SEAT ADJUSTMENT MEANS

CROSS-REFERENCE TO RELATED APPLICATION

This application claims the benefit of priority from German Patent Application No. 10 2010 055 342.5, filed Dec. 21, 2010, which is hereby incorporated by reference in its entirety.

DESCRIPTION

The invention relates to a seat suspension system, in particular a horizontal seat suspension system, for vehicles.

The horizontal vehicle seat suspension systems known from the prior art always require the application of a spring element orientated in the direction to be sprung. An arrangement of this type leads to the vehicle seat suspension system for achieving a specific spring characteristic in the direction to be sprung being very large or only a correspondingly smaller spring characteristic being able to be used, as a result of which however the desired spring characteristic cannot be achieved. In addition, the spring characteristic lines of the spring elements known from the prior art are not capable of being altered or influenced, so that the resulting spring characteristic is not at an optimum.

The object of the present invention is thus to provide a vehicle seat suspension system for cushioning substantially horizontal stimuli, which provides an improved spring characteristic without giving rise to the drawbacks of the prior art during this.

The object specified above is attained according to the invention by a seat for a vehicle, in particular for all-terrain vehicles, with at least one seat area extending in the longitudinal direction of the vehicle or seat respectively and in the width-wise direction of the vehicle or seat respectively for receiving a person, a backrest for supporting the back of the person and a holding device connected in the vertical direction under the seat area and to the latter for keeping the seat area at a distance from a coupling region for coupling the seat to the vehicle, the holding device having at least one spring device for the movable arrangement at least for a time of at least the seat area with respect to the coupling region in the longitudinal direction of the vehicle and/or in the width-wise direction of the vehicle. In this case it is conceivable for the vehicle seat or the seat area of the vehicle seat respectively to be capable of being adjusted or displaced with respect to the vehicle in the width-wise direction of the vehicle and/or in the longitudinal direction of the vehicle.

According to the invention the spring device is formed by at least one fluid spring element, in particular a pneumatic spring element, which is variable in an active manner in the receiving volume and extends in an elongate manner between two application regions, in particular in the longitudinal direction of the vehicle or in the width-wise direction of the vehicle, and onto which pressing forces are capable of being applied at least for a time at an inclination to its longitudinal direction with a deformation device for deforming, in particular for bending, the fluid spring element. It is preferable for the spring element to extend substantially in a horizontal plane and, in a particularly preferred manner, exactly in a plane extending horizontally.

As well as other vehicles, all-terrain vehicles are preferably all agricultural vehicles, construction vehicles, military vehicles, water craft, sports vehicles etc. The term "at an inclination to its longitudinal direction" is preferably understood to be an angle of between 1° and 179°, preferably between 45° and 135° and in a particularly preferred manner an angle of between 80° and 100°, in particular an angle of substantially 90° or exactly 90°. The solution according to the invention is advantageous since it is possible for the desired spring characteristic or the improvement of the spring characteristic to be achieved in a simple manner and with a long service life. In addition, the suspension system is preferably capable of being adapted to varying parameters, such as the weight of the passenger, the inclination of the vehicle, the rate of the introduction of force and/or other parameters.

In accordance with a further preferred embodiment of the present invention the deformation device is part of the spring device and forms a receiving region through which the fluid spring element extends.

This embodiment is advantageous since on account of the receiving region the spring element is precisely positioned or is capable of being precisely positioned and a precise dimensioning and design of the spring element is therefore possible, as a result of which the service life and the costs of the vehicle seat suspension system as a whole are in turn capable of being influenced in a positive manner.

In accordance with a further preferred embodiment of the present invention two preferably opposed contact elements form the receiving region or bound the receiving region and have contact face portions which are in contact with the spring element only for a time.

This embodiment is advantageous since a suspension of the vehicle seat is possible with preferably only one spring element in the width-wise direction of the vehicle and/or in the longitudinal direction of the vehicle, in particular in opposite directions. It is likewise conceivable, however, for a plurality of spring elements to be provided, in which case precisely one spring element or a plurality of spring elements are provided for the cushioning of the seat or the seat area in the width-wise direction of the vehicle and/or precisely one spring element or a plurality of spring elements are provided for the cushioning of the seat or the seat area in the longitudinal direction of the vehicle.

In accordance with a further preferred embodiment of the present invention the contact face portions, which are preferably capable of being brought into contact with the spring element at least for a time, are bent at least locally. In which case it is also preferable for contact face portions which are straight or formed with a slight bend to be capable of being provided, which extend in a particularly preferred manner between the bent contact face portions and connect the latter. A join of two bent contact face portions and one contact face portion—straight or provided with a slight bend—arranged between them preferably forms a contact element.

This embodiment is advantageous since the spring element is capable of being deformed in a flowing movement and on a flowing transition, as a result of which a positive effect on the spring characteristic on the one hand and a deformation of the spring element with very low loading on the other hand are achieved, since loading jumps are reduced or prevented.

In accordance with a further preferred embodiment of the present invention the spring element is a pneumatic spring element and is connected at least for a time in a communicating manner to a gas source for altering the spring characteristic line, the gas preferably being air and in a particularly preferred manner ambient air.

This embodiment is advantageous since a change in the spring characteristic as a result of a change in the spring characteristic line is capable of being achieved by the changes in an air volume or the pressure in the pneumatic spring element in a very simple and very precisely controllable manner.

In accordance with a further preferred embodiment of the present invention the gas source is one or more compressed gas sources and/or one or more gas springs arranged in order to cushion vertical pulses acting mostly upon the vehicle seat, in particular the seat area and/or the coupling region. In this case any supply device which provides the gas at a pressure above the ambient pressure can be regarded as a compressed gas source. A compressed gas source, for example a compressor, a pressure tank, an additional volume, or the like or combinations of them, is particularly preferred.

This embodiment is advantageous since gas from already existing compressed gas sources of the vehicle can be used, as a result of which the seat suspension system is capable of being implemented in a simple, inexpensive manner without substantial increases in complexity.

In accordance with a further preferred embodiment of the present invention at least one sensor unit is provided in order to detect for example seat movements, spring movements, movements of the deformation devices and/or vehicle movements, in particular in the longitudinal direction of the vehicle and/or in the width-wise direction of the vehicle, and/or in order to detect settings or positions of the seat, the spring, the deformation device and/or the vehicle, which transmits data to a control device for actuating the compressed gas source. It is likewise possible, in order to detect individual or all the previously specified settings and/or movements, for a plurality of different sensor devices arranged at different positions to be provided. The sensor device preferably constitutes a path measurement system for detecting the position of the deformation device, the bending of the pneumatic spring element and/or the rotation of the pneumatic spring element.

This embodiment is advantageous since a precise detection of the respective driving and/or sitting situation is possible, preferably in real time. In addition, it is possible for the data, for example from the vehicle seat or the vehicle, detected by the sensor devices to be stored so as to be capable of being evaluated for example at a later time, such as for example with a maintenance deadline.

In accordance with a further preferred embodiment of the present invention with a first stimulus of the vehicle seat a first quantity of a gas is capable of being provided or is provided, for example for producing a first pressure in the spring element, and with a second stimulus a second quantity of gas is capable of being provided for producing a second pressure in the spring element, in which case the second stimulus is stronger than the first stimulus, the second quantity of gas is greater than the first quantity of gas and the second pressure resulting from the supply of the second quantity of gas is preferably greater than the first pressure.

This embodiment is advantageous since it is possible for an actuation of the spring element which is appropriate to the situation to be carried out, i.e. in particular in a manner dependent upon the detected data of the sensor device or devices.

In accordance with a further preferred embodiment of the present invention with the second stimulus the spring element is capable of being deformed by a retraction movement of the deformation device in a first direction and is capable of being returned to a starting or neutral setting by an extension movement of the deformation device in a second direction opposed to the first direction, in which case a gas is capable of being supplied to the spring element during the retraction movement of the deformation device in order to increase the spring force exerted by the spring element upon the deformation device and gas is capable of being withdrawn or removed during the extension movement in order to reduce the recoil or rebound.

This embodiment is advantageous since in addition to a springing effect a damping effect is also capable of being carried out with one spring element, i.e. in particular the pneumatic spring.

In accordance with a further preferred embodiment of the present invention at least one additional volume capable of being activated is connected to the spring element in terms of the fluid at least for a time.

This embodiment is advantageous since the springing and/or damping effect and thus the spring characteristic and the damping characteristic of the vehicle seat suspension system is capable of being changed in a rapid and effective manner with little outlay, and in particular in an automatic or self-acting manner. In this case the additional volume can likewise be regarded as a compressed gas source and in a particularly preferred manner it is capable of being changed in volume by means of a setting device, in particular a piston element. In addition, it is conceivable for the additional volume to be provided with one or more sensor devices through which for example the setting of the setting device or the pressure in the additional volume is capable of being detected.

In accordance with a further preferred embodiment of the present invention the quantity of gas in the air spring is capable of being set manually by the person by means of an actuating element.

This embodiment is advantageous since the person can carry out individual settings and thus, in a particularly preferred manner, need not accept settings taking place exclusively automatically. In this way, depending upon the pressure set by the driver, he or she can set both a soft spring characteristic line up to a very hard spring characteristic line, in particular a spring characteristic line constituting a virtually locked state or even a locked state.

German patent application no. 10 2010 055 344.1, filed Dec. 21, 2010, which relates to the suspension system of a vehicle seat in the width-wise direction of the vehicle and/or in the longitudinal direction of the vehicle, is hereby incorporated by reference in its entirety.

Further advantages, aims and properties of the present invention are explained with reference to the following description of accompanying drawings, in which vehicle seat suspension systems for the substantially horizontal suspension of a vehicle seat are illustrated by way of example. Components of the vehicle seat suspension systems which correspond at least substantially with respect to their function in the figures can be designated with the same references in this case, it being unnecessary for these components to be numbered or explained in all the figures. In the figures FIG. 1 is a diagrammatic illustration of a vehicle with a vehicle seat;

Figure 1:
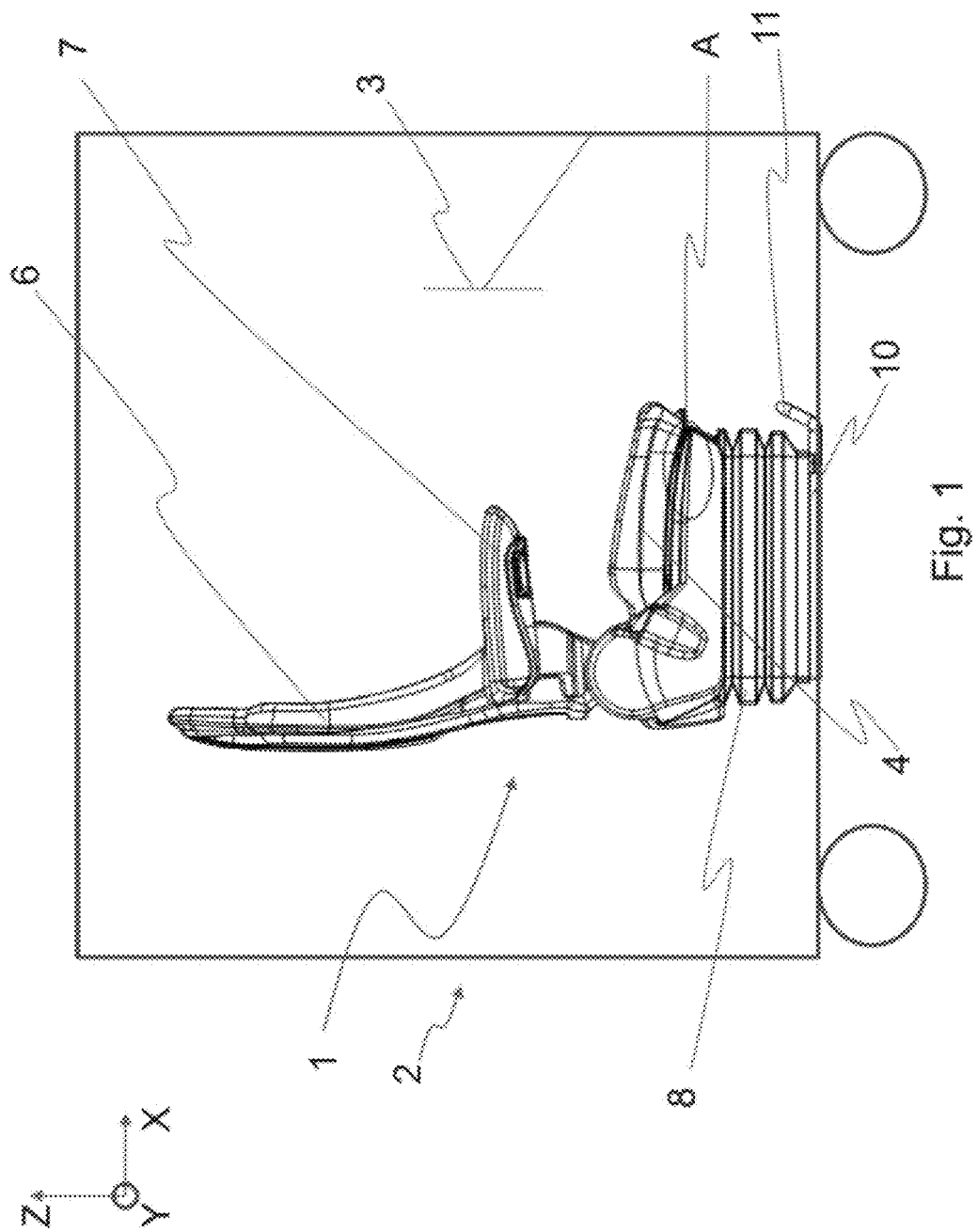
Figure 2:
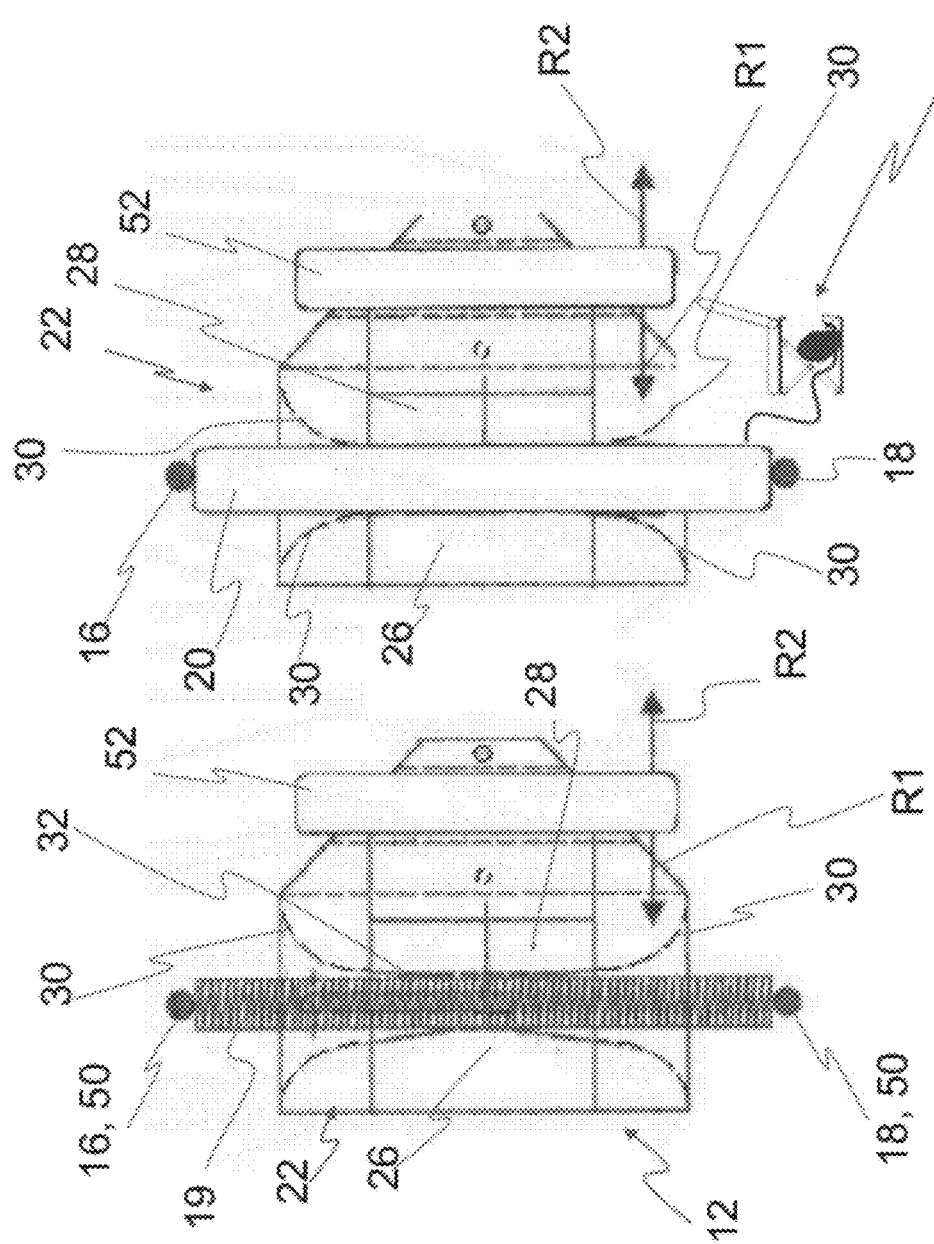
FIG. 2a shows the basic concept of the present invention by way of example.
FIG. 2b shows the basic concept of the present invention whilst using a pneumatic spring.
Figure 3:
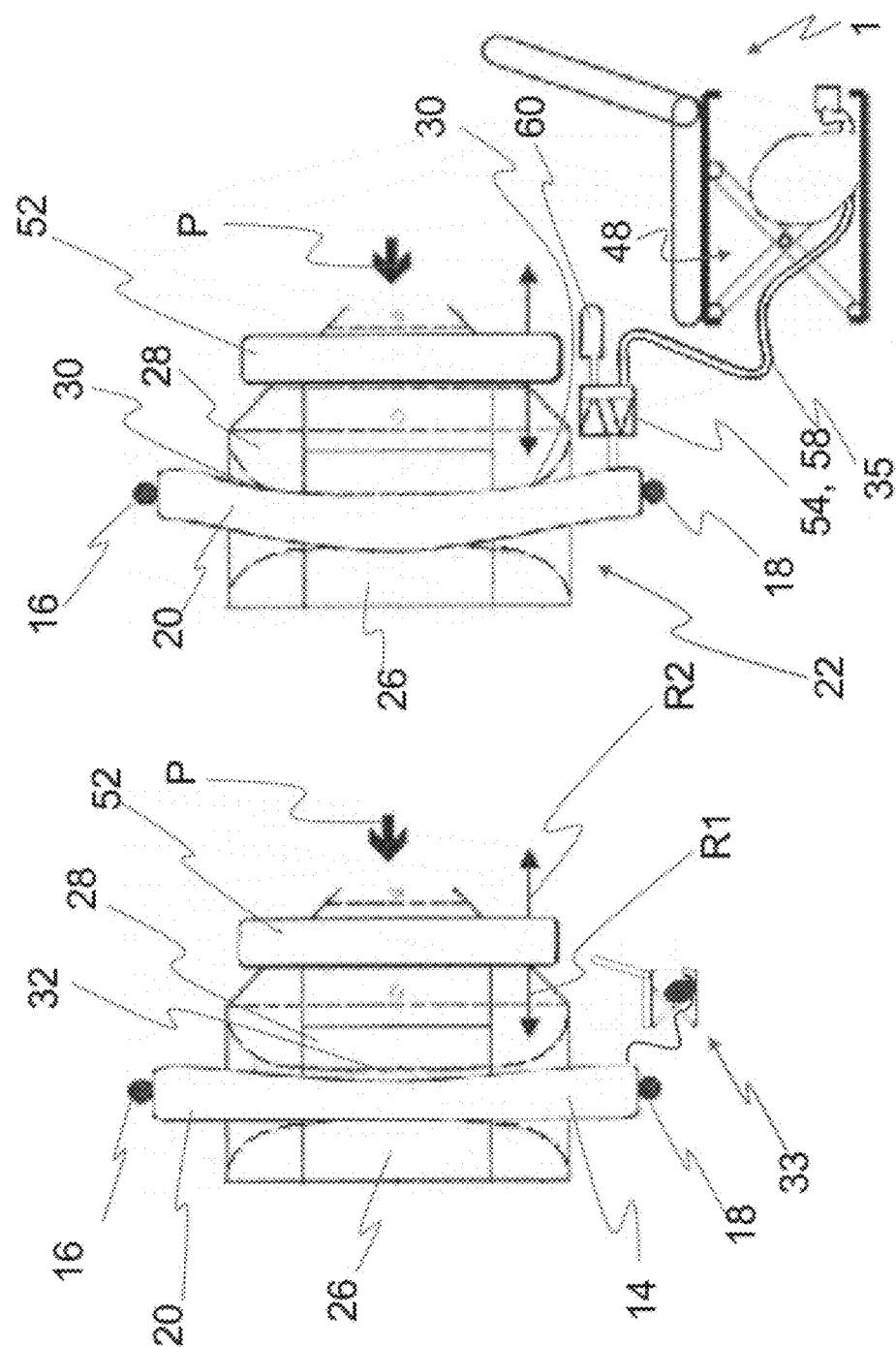
FIG. 3a shows the pneumatic spring in a first state.
FIG. 3b shows the pneumatic spring in a further state.

A seat 1 or a vehicle seat 1 in a vehicle 2 is illustrated in FIG. 1. The vehicle seat 1 is orientated in the longitudinal direction X of the vehicle and has a seat area 4 extending in the width-wise directions Y of the vehicle and/or in the longitudinal direction X of the vehicle as well as a backrest 6 which extends in the vertical direction Z of the vehicle and which is preferably arranged so as to be pivotable with respect to the seat area 4. A steering wheel which is capable of being operated by a person (not shown) sitting on the vehicle seat 1 is designated with the reference number 3. In addition, one or two armrests 7 are preferably arranged on the vehicle seat 1, in particular on the backrest 6.

The seat area 4 is preferably arranged at a distance from the top side of the vehicle floor by a holding region 8, in which case the vehicle 2 and the vehicle seat 1 are preferably connected to each other by way of a coupling region 10 in a fixed manner or a manner movable for a time. A movement of the seat 1 with respect to the vehicle 2 can be for example a displacement, in particular in the longitudinal direction X of the vehicle, in which case a displacement of the seat is capable of being influenced or controlled by means of the handle 11. The reference A designates a region in which the horizontal suspension system or spring device 12 according to the invention (cf. FIGS. 2a to 8b) of the vehicle seat 1 is preferably arranged.

The basic concept of the spring device 12 is illustrated in FIG. 2a. The spring device 12 has a deformation device 22 which is formed by two contact elements 26, 28 preferably opposite each other. The contact elements 26, 28 preferably have bent portions, in particular bent first contact face portions 30 and less bent second contact face portions 32 on which the spring element 19 can rest for a time or permanently. In the illustration shown in FIG. 2a the spring element 19 is a spiral spring 19 which is formed between two application regions 16, 18, in particular on the upper part 50 of the spring. The spiral spring 19 is capable of being brought into contact with one or both of the contact elements 26, 28 as a result of a displacement of the deformation device 22. A displacement of the deformation device 22 in the direction R1 or R2 occurs as a result of a relative movement between the upper part 50 of the spring and the lower part 52 of the spring, which is preferably coupled or connected in a fixed manner to the deformation device 22.

In FIG. 2b the basic concept illustrated in FIG. 2a with the aid of a spiral spring 19 in the embodiment according to the invention is namely provided with a fluid spring element, in particular a hose-like fluid spring element 20, and preferably a pneumatic muscle 20 which preferably extends between the application regions 16, 18 and is thus preferably applied to the upper part 50 of the spring. On account of a high degree of flexibility the pneumatic spring element 20 is adapted in a still simpler manner to the shape of the deformation device 22, in particular to the shape of the contact elements 26, 28, than the spiral spring 19, without producing wear or significant wear during this. In the neutral setting shown in FIG. 2b the pneumatic spring element 20 preferably rests against the entire second contact face portion 32 of one and preferably both contact elements 26, 28. Further seat components, such as for example the seat area 4, the backrest 6, a compressed gas source 34, valve devices 54, 58 etc., are designated generally with the reference number 33.

It is evident from FIG. 3a that the pneumatic spring element 20 is curved inwards in a central sub-area, without the contact element 28 provided in this area touching the pneumatic spring element 20 with the second contact face portion 32. In this way, a state substantially without pressure is present in the receiving volume 14. The arrow P represents a stimulus movement of the vehicle seat 1 or the deformation device 22 respectively. Bending or stretching the pneumatic spring element 20 is easy in the state without pressure since the pneumatic spring element 20 is movable or flexible to a considerable degree. The movement of the deformation device 22 directed in the direction of the arrow P is therefore countered to only a slight degree on account of a very slight spring rate of the pneumatic spring element 20, this state of the pneumatic spring element 20 preferably being set with slight stimuli, in which case it is possible that with slight stimuli the deformation device 22 penetrates into the pneumatic spring element 20 or presses in the flexible wall of the pneumatic spring element 20. The deformation device 22 can likewise be referred to as a clasp 22. A state is shown in FIG. 3b in accordance with which the lower part 52 of the spring and the upper part 50 of the spring have been moved still further towards each other or the deformation device 22 has been displaced still further in the direction of the arrow P. As compared with the state shown in FIG. 3a, the state shown in FIG. 3b represents a state with a greater stimulus, as a result of which it is also preferable for additional gas, in particular air, to have been or to be supplied to the pneumatic spring element 20, this being evident in particular from the fact that the pneumatic spring element 20 rests against the two contact elements 26, 28. In addition, it is evident that the pneumatic spring element 20 is in contact or is in partial contact with the contact face portions 30. In this way, as the deviation increases, the pressure and thus the counteracting force of the pneumatic spring element 20 are increased so as to prevent the seat frame portions of the seat suspension means which are movable relative to one another from striking.

On the return path or the restoring movement the pressure is preferably released, so that the returning force is reduced and thus a rocking as a result of the rebound is prevented.

A valve device which can be designed for example in the form of a two-way shut-off valve 54 and/or in the form of an air inlet and outlet valve 58 is preferably characterized by the reference numbers 54, 58. In addition, a throttle 60, in particular an outlet air throttle 60, is preferably connected in terms of fluid to the valve device 54, 58. Inlet or outlet air is capable of being supplied to or the valve device 54, 58 removed from the pneumatic spring element 20 or for example by way of a line connection 35 which can be coupled to further devices, such as for example further valve devices and/or gas sources. The line connection 35 can be designed at least locally in the form of a tube and/or hose. A seat frame, in particular a scissor-type frame, of the vehicle seat 1 is preferably characterized by the reference number 48.

A long-term deviation from the middle rest position or the neutral setting can be countered by a continuous build-up of pressure and, in this way, an adequate spring path can be provided for the introduction by an ascending spring characteristic line. Long-term deviations from the middle rest position are possible for example in up-hill and down-hill travel. In horizontal rest operation, i.e. preferably only with slight stimuli, a soft spring characteristic line for vibration insulation is advisable both for heavy and for light drivers.

Figure 4:
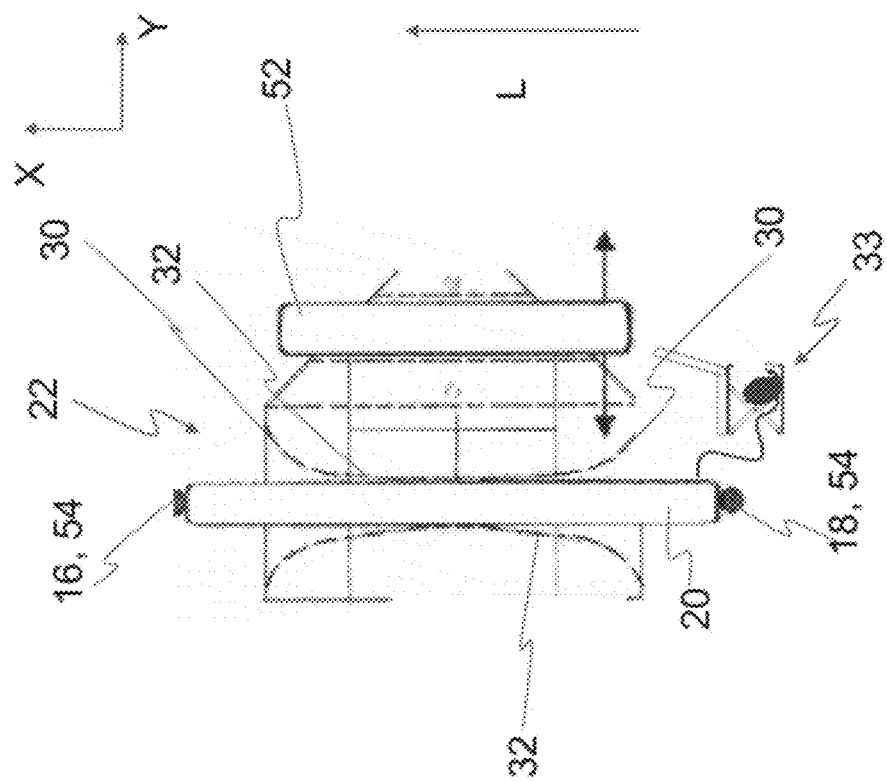
FIG. 4 shows a vehicle seat suspension system with a changed pneumatic spring.
Figure 5:
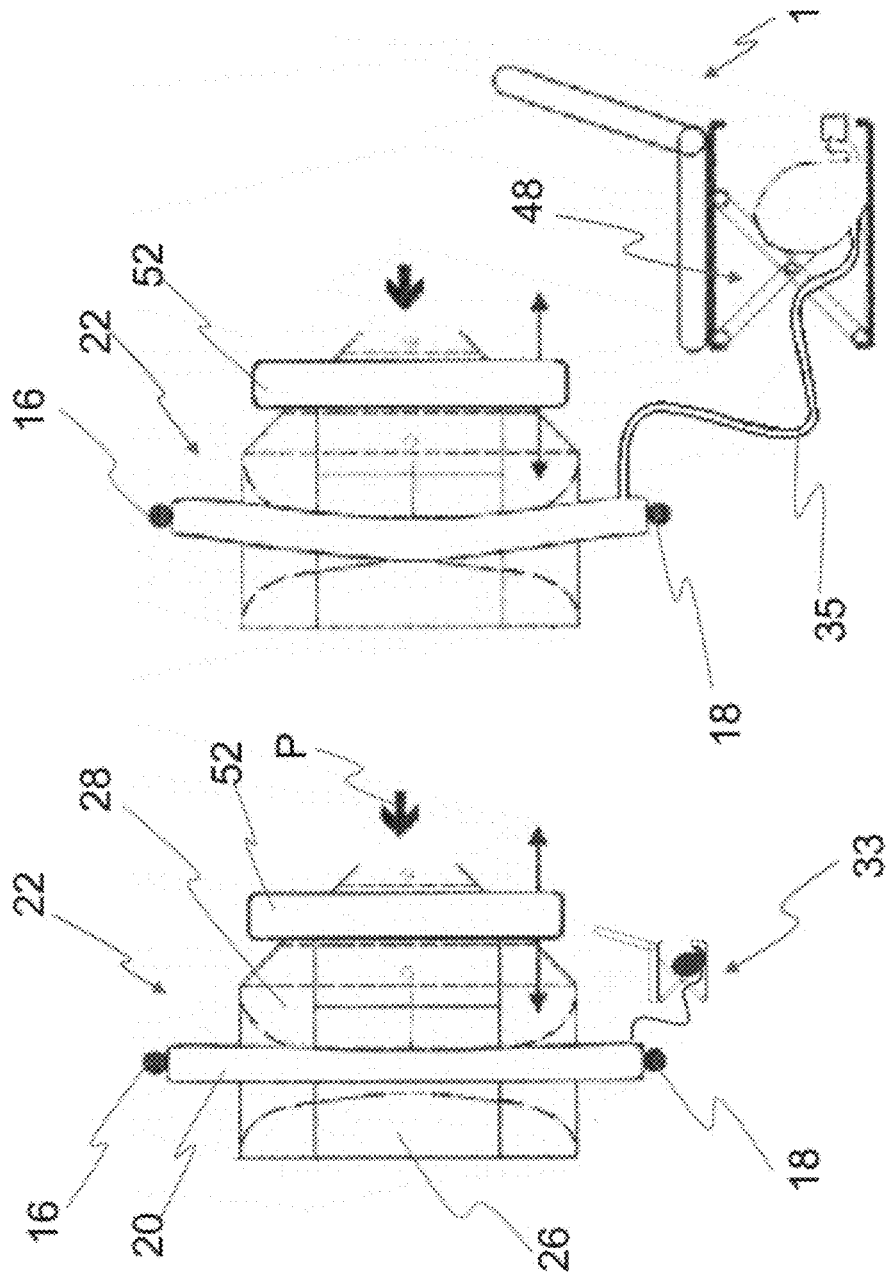
FIG. 5a shows the pneumatic spring as shown in FIG. 4 in a first state.
FIG. 5b shows the pneumatic spring as shown in FIGS. 4 and 5a in a further state.

The embodiments illustrated in FIGS. 4, 5*a* and 5*b* essentially correspond to the embodiments illustrated in FIGS. 2*a* to 3*b*, the pneumatic spring element 20 being shown thinner, i.e. the receiving volume 14 is shown smaller and so the pneumatic spring element 20 does not rest completely against the second contact face portions 32 in the neutral setting.

Figure 6:
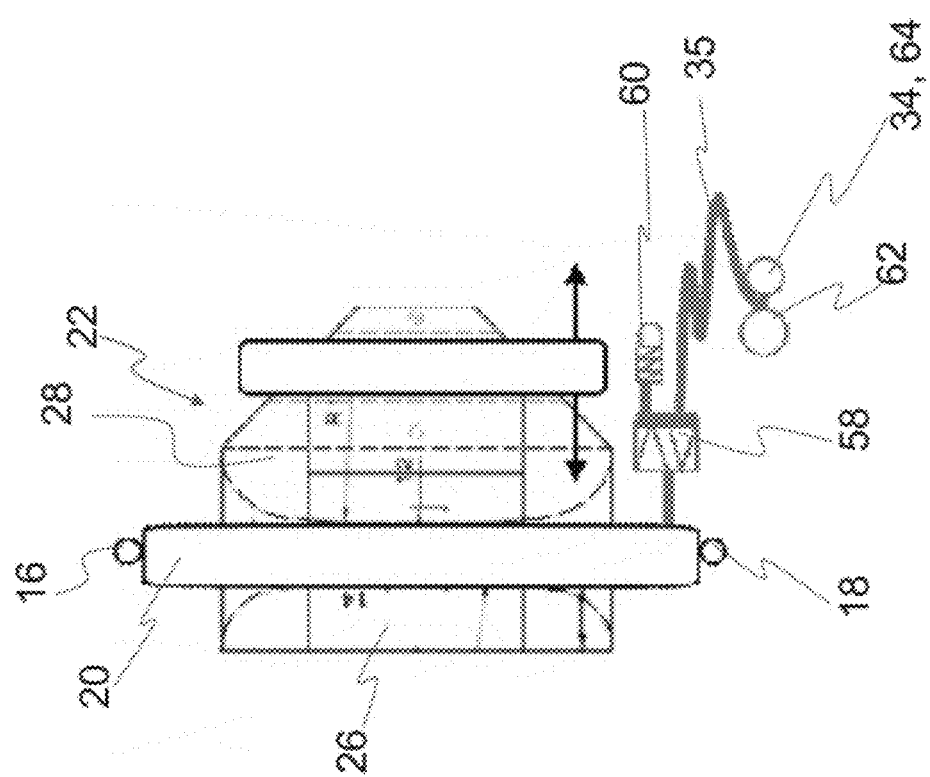
FIG. 6 shows a vehicle seat suspension system with a changed fluid supply.
Figure 7:
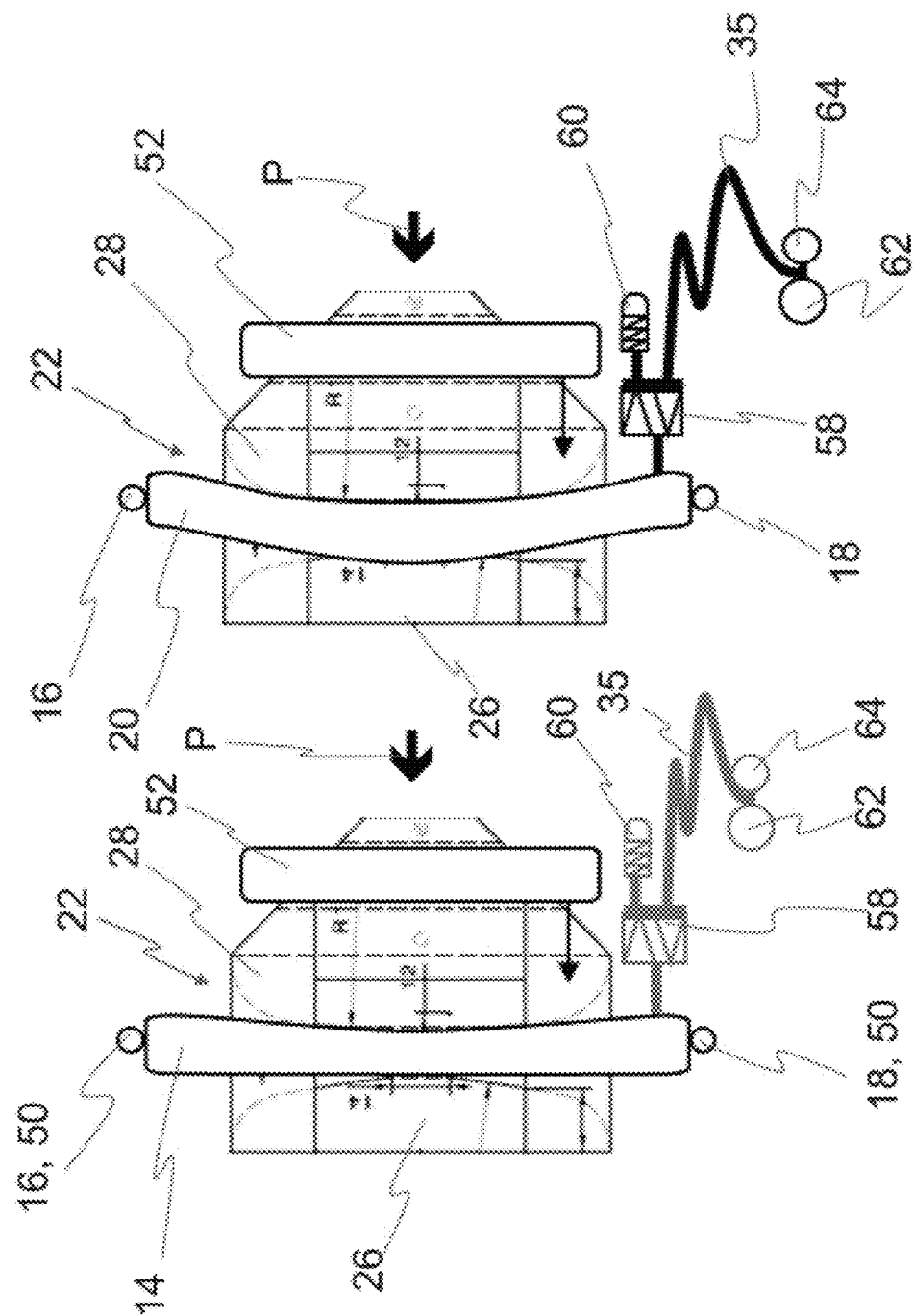
FIG. 7a shows the pneumatic spring as shown in FIG. 6 in a first state.
FIG. 7b shows the pneumatic spring as shown in FIGS. 6 and 7a in a further state.
Figure 8:
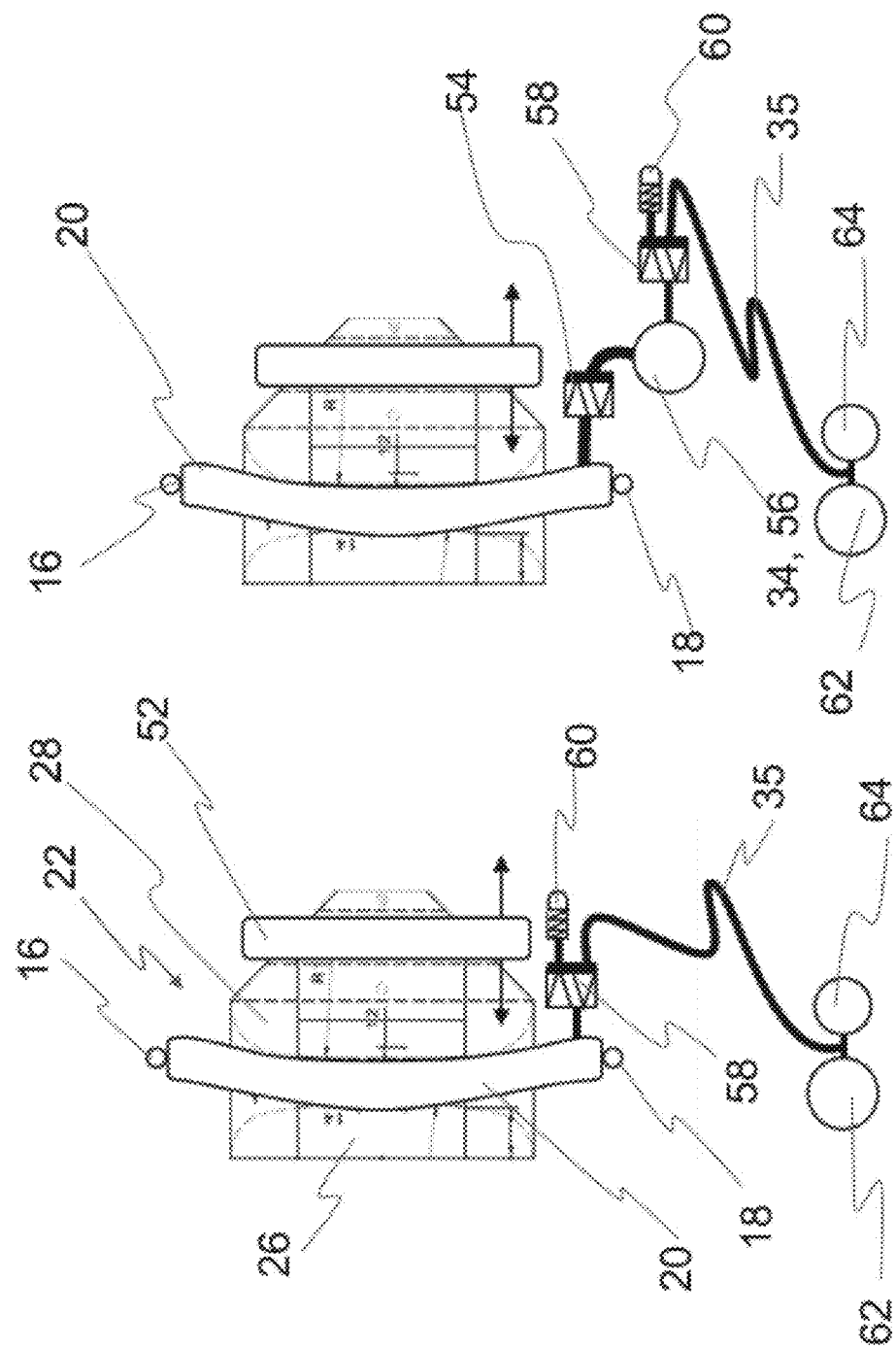
FIGS. 8a and 8b show different fluid supply arrangements.

The embodiments shown in FIGS. 6, 7*a* and 7*b* likewise correspond essentially to the embodiments described above, in which case, however, FIGS. 6, 7*a* and 7*b* cover deviating fluid supply means. As shown in FIGS. 6, 7*a* and 7*b* the fluid spring element 20 is connected by way of at least one line connection 35, in which an inlet or outlet air valve 58 is arranged, to a compressed gas source 34, in particular a compressor 64, and an air supply 62, in particular the environment, a gas storage device and/or a further line connection or a further supply network respectively.

In all the embodiments according to the invention it is preferable for the pressure to be substantially proportional or exactly proportional to a bending and/or stretching of the pneumatic spring element 20. In a particularly preferred manner the pressure in the pneumatic spring element 20 or the pre-stressing of the pneumatic spring element 20 can be capable of being set proportional to the driver's weight, and in particular a change in pressure in the pneumatic spring device 20 is carried out in a manner dependent upon a loading of a gas spring provided for the vertical springing. In this way, the pneumatic spring device 20 can be designed to communicate in terms of fluid with a further pneumatic spring device which is provided in particular for the springing of the vehicle seat 1 in the vertical direction Z. The further pneumatic spring device can thus constitute a compressed gas source or a gas source 34. In this way, the spring characteristic line of the pneumatic spring element 20 is preferably capable of being set in a passive and automatic manner as a consequence of a loading of the vehicle seat 1 by a passenger.

Two different fluid supply arrangements for the fluid supply of the pneumatic spring element 20 are illustrated in FIGS. 8*a* and 8*b*. The fluid supply arrangement shown in FIG. 8*a* corresponds to the fluid supply arrangement shown in FIGS. 6, 7*a* and 7*b*. Between the pneumatic spring element 20 and the valve device 58, i.e. preferably the inlet and outlet air valve, the fluid supply arrangement shown in FIG. 8*b* has an additional volume 34, 56 and a further valve device 54, in particular a two-way shut-off valve.

It is likewise possible for the pneumatic spring element 20 for damping or springing the vehicle seat 1 in the longitudinal direction X of the vehicle to be arranged orientated with its longitudinal axis L in the width-wise direction Y of the vehicle. In an arrangement of this type the attachment to the upper part of the suspension presses towards the right (the rear). In addition, further assistance can be provided by inlet air. Since the driver cannot slip off the seat during up-hill travel and so does not work with his or her legs against the slope power take-off force, in this case more counter pressure by the air spring is necessary in order to prevent striking toward the rear.

On account of this regulation of the inlet air and outlet air, at each position (horizontal, up-hill, down-hill) the springing system is set into the middle of the spring path, so that an adequate spring path is always available for stimuli.

Turning the additional volume 56 on and off for the air spring or the pneumatic spring element 20 respectively can build up resulting additional forces over the spring path against the stimuli for a short time, in order to counteract the latter. With a further deviation, a smaller operating volume, without the additional volume 56, results in a greater compression and thus an increased counter force. The same applies to the expansion in the opposite direction. In the case of a stimulus towards the front the additional volume 56 of the air spring 20 can be turned off from the halfway point, so that the driving force towards the front is reduced earlier. The same applies to the stimulus towards the rear. As a result of turning off the additional volume 56 during the reversal of direction of the stimulus the built-up energy of the air spring 20 is dissipated into the additional volume 56, as a result of which the system is sprung back to a lesser degree. As a result, the system rocks to a lesser degree, and this makes a positive contribution to the vibration insulation.

A further principle is that a change in volume, which is caused by the penetration of the clasp or the deformation device 22 laterally into the pneumatic spring element 20 or by the bending of the pneumatic spring element 20 respectively, is allowed to a greater or lesser degree by turning the additional volume 56 on and off.

If more volume is available as a result of turning on the additional volume 56, as viewed relatively the spring or the pneumatic spring element 20 is compressed less in its effective area when deformed than when the additional volume 56 is shut off. More space is available for the displacement of the air molecules by the penetration or bending. As a result the pressure rises only slightly. A softer spring characteristic line thus applies. In the case of small deviations it is thus advisable to operate with the additional volume 56 turned on. In the case of larger deviations the additional volume 56 is turned off after a specified path in order to compress to a greater degree the hose or the pneumatic spring element 20 with further deviation in the direction of the end of the spring path. As a result, an increased counter force is built up so as not to touch the end stop.

Figure 9:
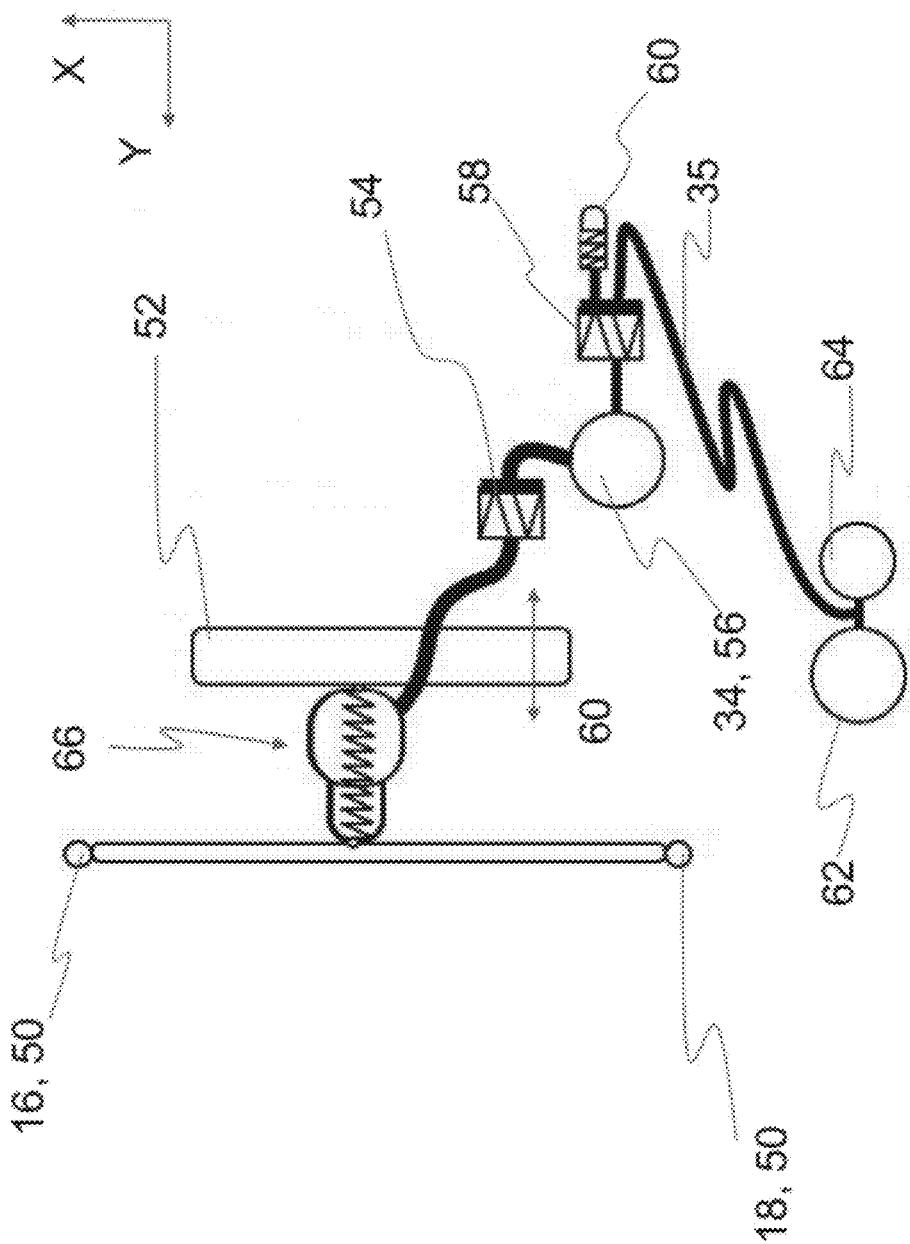
FIG. 9 shows a further embodiment according to the invention with a pre-stressed air spring in the form of a rolling lobe.

A further embodiment of the present invention is illustrated in FIG. 9. It is evident from this illustration that precisely one or at least one pre-stressed air spring is arranged in the form of a rolling lobe 66 between the first suspension part or the upper part 50 of the suspension and the second suspension part or the lower part 52 of the suspension.

An air spring operates as a rolling lobe with very low friction if it is acted upon with pressure. This pressure leads to an extension force and thus to the setting of the middle in the available spring path in a system pre-stressed with a helical spring (=replacement of the weight of a vertical air spring). In the illustration shown in FIG. 9 the "forward" direction of travel preferably extends in the direction of the arrow "Y".

The helical spring is made weak in such a way that during travel down-hill at the end of the spring path a spring force of approximately 200 N acts against the slope power take-off force and the air spring weakly pre-stressed with pressure. More force is not necessary, since the driver additionally presses with his or her feet against the deviation so that he or she would not otherwise slip from the seat in the case of a descent of this type. In the case of travel down-hill of greater duration the pressure of the air spring can be additionally reduced by way of the outlet air valve.

During travel up-hill the attachment to the upper part of the suspension presses against the direction Y and thus towards the rear.

In addition, further assistance can be provided by inlet air, i.e. for example air is capable of being supplied or removed in a manner controlled by a sensor and in dependence upon the travel situation of the air spring 66. Since the driver cannot slip off the seat when travelling up-hill and so does not work with his or her legs against the slope power take-off force, more counter pressure by the air spring 66 is necessary in this case in order to prevent striking towards the rear.

On account of this regulation of the inlet and outlet air, at each position (horizontal, up-hill, down-hill) the springing system is set into the middle of the spring path, so that an adequate spring path is available for stimuli.

Turning the additional volume 34, 56 on and off for the air spring 66 can build up resulting additional forces over the spring path against the stimuli for a short time, in order to counteract the latter. With a further deviation, a smaller operating volume, without the additional volume 34, 56, results in a greater compression and thus an increased counter force. The same applies to the expansion in the opposite direction. In the case of a stimulus towards the front the additional volume 34, 56 of the air spring 66 can be turned off from the halfway point, so that the driving force of the system towards the front is reduced earlier. The same applies to the stimulus towards the rear. As a result of turning off the additional volume 34, 56 during the reversal of direction of the stimulus the built-up energy of the air spring 66 is dissipated into the additional volume 34, 56, as a result of which the system is sprung back to a lesser degree. As a result, the system rocks to a lesser degree, and this makes a positive contribution to the vibration insulation.

Figure 10:
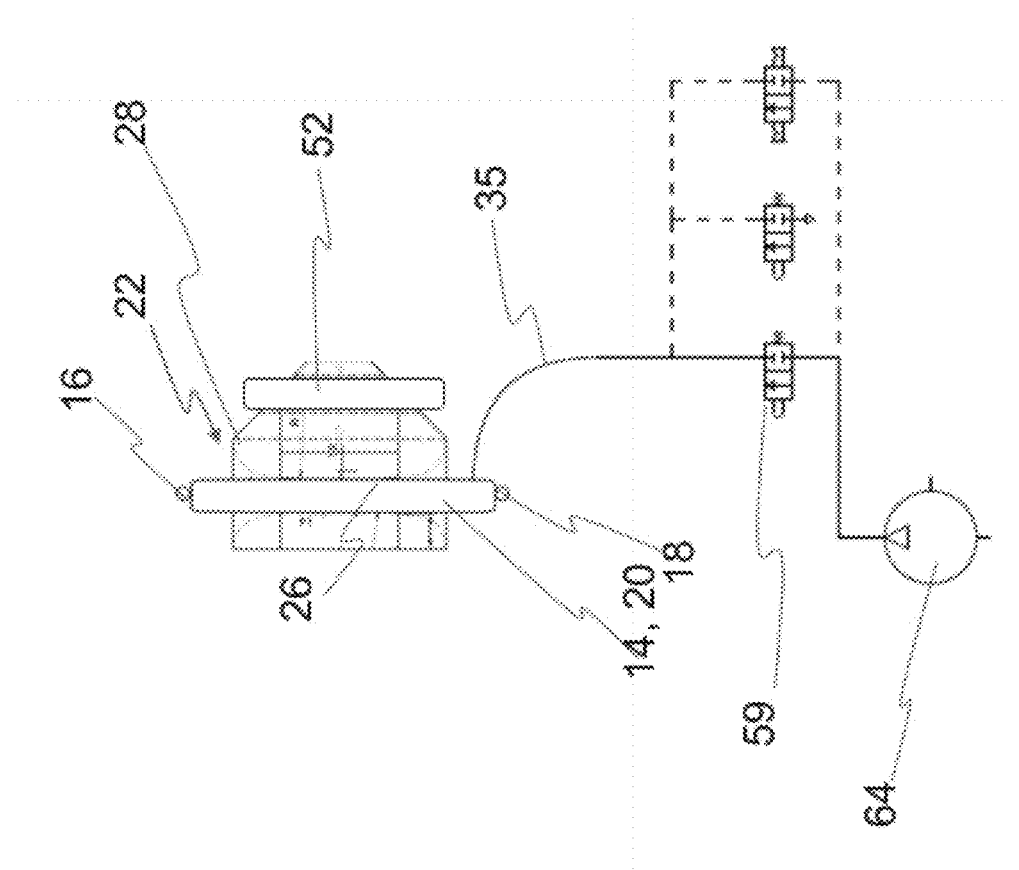
FIG. 10 shows a further arrangement according to the invention for locking the longitudinal horizontal suspension system of the vehicle seat.

In FIG. 10 the air spring 14 is connected by way of a line connection 35 to at least one compressed gas source, in particular an air spring for the vertical springing of the vehicle seat and/or to a compressor 64, it being preferable for at least one valve device or a further valve device 59 to be arranged between the compressed gas source. The further valve device 59 is preferably a 2/2-way valve through which a gas flow, in particular an air flow, is capable of being conveyed in a first setting and by means of which a gas flow is capable of being retarded and in a particularly preferred manner is capable of being completely interrupted in a second setting. The attachment or the use of alternative or additional valve devices is shown by the lines indicated with dashes.

A manual setting facility of the spring characteristic line or the rigidity of the spring is preferably made possible by means of the valve device 59, and this constitutes a further embodiment of longitudinal horizontal suspension means (LH-suspension).

In the case of this system the user/driver preferably carries out the setting of the spring hardness for the longitudinal horizontal suspension means.

In this case the design of the spring 14 should preferably be determined in such a way that a very low operating pressure, which in a particularly preferred manner is far below the operating pressure of the vertical spring, is necessary for the vibration insulation in the longitudinal horizontal direction.

The aim of this design at a low operating pressure is, in addition, that in the event of an increase in pressure (up to a maximum vertical pressure) in the LH suspension a stiffening of the air spring 14 takes place, as a result of which no movements or only slight movements are still carried out in the longitudinal horizontal direction. A blocking with positive and/or non-positive locking is therefore preferably capable of being carried out.

It should be mentioned at this point that the Applicants reserve the right to claim all the features disclosed in the application documents, insofar as either individually or in combination with one another they further develop in an advantageous manner vehicle seats according to the category or known from the prior art.

List of References
1 seat/vehicle seat
2 vehicle
3 steering wheel
4 seat area
6 backrest
7 armrest
8 holding device
10 coupling region
11 handle
12 spring device
14 receiving volume
16 first application region
18 second application region
19 spiral spring
20 fluid spring element
22 deformation device
24 receiving region
26 first contact element
28 second contact element
30 first contact face portions
32 second contact face portions
33 seat components
34 gas source/compressed gas source
35 line connection
36 additional volume
48 scissor-type frame
50 upper part of the suspension
52 lower part of the suspension
54 valve device
56 additional volume
58 valve device
59 further valve device
60 throttle
62 air supply
64 compressor
66 pre-stressed air spring
A application region
L longitudinal direction
P arrow
R1 first direction
R2 second direction
X longitudinal direction of the vehicle or seat
Y width-wise direction of the vehicle or seat
Z height direction of the vehicle or seat/vertical direction

The invention claimed is:

1. A seat for a vehicle, comprising at least one seat area extending in the longitudinal direction (X) of the vehicle and in the width-wise direction (Y) of the vehicle for receiving a person, a backrest for supporting the back of the person and a holding device connected in the vertical direction (Z) under the seat area and to the latter for keeping the seat area at a distance from a coupling region for coupling the seat to the vehicle, wherein the holding device has at least one spring device for a movable arrangement of at least the seat area with respect to the coupling region in the longitudinal direction (X) of the vehicle and/or in the width-wise direction (Y) of the vehicle, wherein the spring device is formed by at least one fluid spring element, which is variable in a receiving volume and extends in an elongate manner between two application regions and onto which pressing forces are capable of being applied at an inclination to its longitudinal direction (L) with a deformation device for deforming the fluid spring element.

2. The vehicle seat according to claim 1, wherein the deformation device is part of the spring device and forms a receiving region through which the fluid spring element extends.

3. The vehicle seat according to claim 2, wherein two contact elements form the receiving region and have contact face portions which are configured to contact the fluid spring element during movement of the seat area in response to a sufficient displacement force.

4. The vehicle seat according to claim 3, wherein the contact face portions are bent at least locally.

5. The vehicle seat according to claim 1, wherein the fluid spring element is connected at least for a time in a communicating manner to a gas source for altering a spring characteristic line.

6. The vehicle seat according to claim 5, wherein the gas source is a compressed gas source and/or a gas spring arranged in order to cushion vertical pulses.

7. The vehicle seat according to claim 6, wherein at least one sensor unit is provided in order to detect seat movements and/or vehicle movements wherein the at least one sensor unit transmits data to a control device for actuating the compressed gas source.

8. The vehicle seat according to claim 7, wherein the at least one sensor unit detects seat movements and/or vehicle movements in the longitudinal direction (X) of the vehicle and/or in the width-wise direction (Y) of the vehicle.

9. The vehicle seat according to claim 1, wherein with a first stimulus of the vehicle seat a first quantity of a gas is capable of being provided in the fluid spring element, and with a second stimulus a second quantity of gas is capable of being provided in the fluid spring element, wherein the second stimulus is stronger than the first stimulus and the second quantity of gas is greater than the first quantity of gas.

10. The vehicle seat according to claim 9, wherein with the second stimulus the fluid spring element is capable of being deformed by a retraction movement of the deformation device in a first direction and is capable of being returned by an extension movement of the deformation device in a second direction opposed to the first direction, wherein a gas is capable of being supplied to the fluid spring element during the retraction movement of the deformation device in order to increase the spring force exerted by the fluid spring element upon the deformation device and gas is capable of being withdrawn during the extension movement in order to reduce a recoil.

11. The vehicle seat according to claim 9, wherein at least one additional volume for supplying or receiving gas is connected at least for a time in a communicating manner to the fluid spring element.

12. The vehicle seat according to claim 1, wherein a quantity of gas in the fluid spring element is capable of being set manually by means of an actuating element.

13. The vehicle seat according to claim 1, wherein the vehicle seat is configured for use in an all-terrain vehicle.

14. The vehicle seat according to claim 1, wherein the fluid spring element is a pneumatic spring element.

15. The vehicle seat according to claim 1, wherein the deformation device bends the fluid spring element.

* * * * *